(12) United States Patent
Hensel

(10) Patent No.: US 7,375,988 B2
(45) Date of Patent: May 20, 2008

(54) SELF-SYNCHRONIZED HIGH VOLTAGE SYNCHRONOUS RECTIFIER AND DRIVE

(75) Inventor: John Hensel, Hampton, NH (US)

(73) Assignee: Wall Industries, Inc., Exeter, NH (US)

( * ) Notice: Subject to any disclaimer, the term of this patent is extended or adjusted under 35 U.S.C. 154(b) by 0 days.

(21) Appl. No.: 11/075,264

(22) Filed: Mar. 8, 2005

(65) Prior Publication Data

US 2006/0203522 A1 Sep. 14, 2006

(51) Int. Cl.
*H02M 3/335* (2006.01)
*H02M 7/217* (2006.01)
(52) U.S. Cl. .................. 363/21.06; 363/127
(58) Field of Classification Search ........... 363/21.06, 363/21.14, 89, 127
See application file for complete search history.

(56) References Cited

U.S. PATENT DOCUMENTS

| 5,590,032 | A | 12/1996 | Bowman et al. |
| 6,256,214 | B1 * | 7/2001 | Farrington et al. ......... 363/217 |
| 6,304,463 | B1 * | 10/2001 | Krugly .................... 363/21.06 |
| RE37,510 | E | 1/2002 | Bowman et al. |
| 6,490,183 | B2 * | 12/2002 | Zhang ........................ 363/89 |
| 6,707,650 | B2 | 3/2004 | Diallo et al. |
| 7,054,168 | B1 * | 5/2006 | Fronk ..................... 363/21.06 |
| 2002/0110005 | A1 | 8/2002 | Mao et al. |
| 2004/0240243 | A1 | 12/2004 | Meyer et al. |

* cited by examiner

*Primary Examiner*—Gary L Laxton
(74) *Attorney, Agent, or Firm*—Burns & Levinson, LLP; Jacob N. Erlich, Esq.

(57) ABSTRACT

This invention describes a method for using self-synchronized (also known as self-driven), synchronous rectifiers in converters employing high output voltages or conversely, in converters with wide input voltage ranges.

4 Claims, 5 Drawing Sheets

SELF-SYNCHRONIZED HIGH VOLTAGE SYNCHRONOUS RECTIFIER AND DRIVE

FIELD OF THE INVENTION

The current invention relates to power converters and to drivers for power converters. In particular, it relates to alternating current (AC) to direct current (DC) and DC to DC power converters. More particularly, it relates to AC to DC and DC to DC switch mode power converters. Most particularly, it relates to switching type power converters incorporating self-synchronized synchronous rectifying devices and circuits.

BACKGROUND OF THE INVENTION

A power converter is a power processing circuit that converts an input power waveform, sometimes with, sometimes without, a DC component, to a DC output. A classic AC to DC converter comprises a transformer with a primary side and a secondary side with a rectifying circuit of varying complexity on the secondary side. In the past, most such rectifying circuits used diodes, either singly or in combination, on the secondary side. A more complicated combination that was frequently used in prior art was a half wave or a full wave bridge rectification circuit. Following the rectification part of the circuit was a circuit portion devoted to filtering out the residual AC components, thereby smoothing and regulating the DC output. A DC to DC converter adds a switching function to the primary side of the circuit to enable the transformer to step the output voltage up or down.

The advent of more modern solid state devices made it possible to increase the sophistication of conversion and rectification circuits. In particular, the development of certain types of metal oxide semiconductor field effect transistors (MOSFETs) enabled the development of synchronous rectifying circuits, namely those that use the gating function of a MOSFET instead of a diode to turn current on and off in portions of a secondary circuit. In particular, enhancement-type MOSFETs act as very effective rectifiers when the gate is zero- or reverse-biased during the portion of the cycle in which the secondary current would flow in the reverse direction, but allow current flow when the gate is forward biased.

Self-synchronized rectifiers are MOSFET rectifiers having gate terminals that are driven directly or indirectly by the voltage from a winding of the power transformer in order to provide the rectification of the output of the transformer. Typically, synchronous rectifiers have been used in converters with low output voltages, less than 5 volts, as the gate drive voltages needed to drive the gates of the MOSFET synchronous rectifiers are easily obtainable from the output of the power transformer. This method of driving synchronous rectifiers, shown in FIG. 1, is widely described in the prior art. FIG. 2 shows voltages at relevant points in such a prior art circuit.

As higher converter efficiencies are constantly sought, it has been desired to provide the benefits of synchronous rectification in converters with either higher output voltages or wider input voltage ranges. A problem therefore arises as to how to effectively drive the gates of the MOSFET when the voltages provided by the output of the transformer on higher output voltage converters typically exceed the maximum MOSFET gate drive specification. Likewise, in a power converter that has a wide input voltage range, the voltage applied to the primary of the transformer will have a large range. As a result, the voltage at the output of the secondary of the transformer will also have a large range. Since most MOSFETs have a limitation that the peak voltage at the gate must be typically 20 volts or less, in such circuits the output side voltage will be too large to drive the gates of MOSFET synchronous rectifiers.

Inventors have tried various solutions to these and other problems with prior art MOSFET rectifying circuits. For example, Meyer, et al., Published U.S. Patent Application No. 2004/0240243 A1, published Dec. 2, 2004 describes a method for predicting the proper MOSFET gate drive timing by sensing the diode drop across the synchronous MOSFET and by utilizing a complex algorithm to compute the optimum gate drive timing. This approach incorporates an integrated circuit (IC) component to the design along with its associated cost and complexity. Meyer does not disclose self-driven synchronous MOSFET gate timing.

Other inventors have devised methods for dealing with the voltage-range limitations of prior art self-synchronized drivers and rectifiers. A good example is Bowman, et al., U.S. Reissue Patent No. RE37,5 10 E, reissue date Jan. 15, 2002 (reissue of U.S. Pat. No. 5,590,032, issued Dec. 36, 1996). The Bowman circuit, however, has the drawback of requiring an extra winding on the transformer. On converters that utilize wound magnetics (transformers whose windings are wound using magnet wire) the addition of an extra winding is not too severe an imposition. However, most of today's high-performance DC-DC converters utilize planar magnetics (magnetics that use printed circuit board (PCB) traces as windings).

With planar magnetics, the addition of more windings usually means the addition of another layer to the printed circuit board. Since the board typically is the largest cost component of a DC-DC converter, reducing the number of layers and complexity of the board reduces the cost of the board and thus the cost of the converter.

Even if a planar design is achieved that does not require an extra layer to the circuit board, such a design will still cut into the amount of space available for the power winding, and reduce the copper available to the power winding. Since most of today's DC-DC converters operate at high output currents, cutting into the amount of copper available to the power winding reduces the converter efficiency.

Mao, et al., Published U.S. patent application Ser. No. 2002/0110005 A1, published Aug. 15, 2002, describes a circuit similar to that of Bowman, et al. The Mao, et al. circuit is an effective means of driving the gates of MOSFETs at higher voltages, but it too requires additional windings (in this case two additional windings) on the transformer.

Diallo, et al, U.S. Pat. No. 6,707,650 B2 issued Mar. 16, 2004, demonstrates most clearly the need for the current invention. In the Diallo circuit, as the output voltages of the transformer get larger, the gate drive voltages to the MOSFET gets larger until it exceeds the maximum level. Diallo, et al. attempt to solve this problem by sizing the capacitor (Items 13 and 16 in FIG. 2A of the '650 patent) in series with the gate of the MOSFET such that it forms a capacitive divider with the intrinsic internal capacitance of the synchronous MOSFET. However, as MOSFET gate capacitances are on the order of 1000 to 5000 pF, in order to divide the drive voltage in half, a series capacitor equal to the intrinsic MOSFET gate capacitance would have to be used.

The current state of the art in the power converter industry is to use increased switching frequencies, typically greater than 500 kHz, in order to reduce the size of the magnetics. The trend is also to reduce the MOSFET intrinsic gate capacitance in order to reduce the MOSFET switching times, thereby improving switching efficiency. Unfortunately, the impedance of a 1000 to 5000 pF capacitor at the frequencies (>350 kHz) at which most modern DC to DC converters are run would turn the synchronous MOSFETs on so slowly as such to render them highly inefficient. Therefore, Diallo's method of driving a MOSFET is mostly appropriate on older lower frequency (<100 kHz) converters that utilize large synchronous MOSFTETs (with correspondingly large intrinsic capacitance), so that the series gate capacitor may also be large.

It is an object of this invention to provide a simple, cost-effective, self-driven converter circuit for driving the gates of synchronous MOSFETs that is simpler and cheaper to implement in today's high density, planar magnetic, DC-DC converters. It is a further object of this invention to provide a self-synchronized synchronous drive circuit capable of producing high voltage outputs. It is yet a further object of this invention to provide such a circuit in which MOSFET gate timing is achieved by sensing the secondary of the DC-DC converter's output transformer. It is a further object of the invention to provide such a circuit in which MOSFET gate timing is achieved by sensing the secondary of the DC-DC converters output transformer without including a complex integrated circuit. It is yet a further object of this invention to provide a circuit that can be utilized at virtually any switching frequency and with any output voltage from the secondary of the power transformer.

SUMMARY OF THE INVENTION

The current invention is a synchronous MOSFET gate drive that includes a second 'driver' MOSFET or bipolar transistor, the drain of which or the collector of which, is connected to a fixed voltage source, $V_{cc}$ that may include the main or any secondary converter output voltages, a voltage rectified from an additional winding on the output inductor, or a voltage derived from a separate converter winding. The source or emitter of this driver MOSFET or bipolar transistor is connected to the gate of the synchronous MOSFET either directly or together with a gate limiting circuit such as a resistor, a capacitor, or a capacitor in parallel with a diode. The gate or bipolar transistor base of the driver MOSFET or bipolar transistor is connected through a resistor to the drain of said driver MOSFET or collector of the bipolar device.

A switch, usually in the form of a diode but alternatively in the form of an additional MOSFET or bipolar, holds the gate of the driver MOSFET or bipolar low when the winding it is connected to is low. This 'turns off' the driver MOSFET or bipolar, which then turns off the synchronous MOSFET. An additional switch, usually a diode but alternatively in the form of an additional MOSFET or bipolar, connected between the winding and the gate of the synchronous MOSFET or bipolar may be additionally used to rapidly turn off the synchronous MOSFET.

When the winding is high, the switch no longer holds the gate of the MOSFET or bipolar driver low. This allows the gate of the driver to rise to the $V_{cc}$ voltage. This rise turns on the driver which then turns on the synchronous MOSFET. The advantage of this scheme over the prior art low-voltage scheme is that the gate of the synchronous MOSFET is subject to a maximum voltage stress of $V_{cc}$. In the prior art scheme, on the other hand, the gate of the MOSFET is subject to whatever voltage is at the output of the transformer winding. Additionally, the gate of the driver MOSFET is also only subject to a maximum voltage stress of $V_{cc}$. Since $V_{cc}$ is a voltage that may be chosen by the designer, the MOSFET gates are properly protected from any extreme voltages that may be found at the output of the transformer.

DETAILED DESCRIPTION OF THE PREFERRED EMBODIMENT

Figure 1:
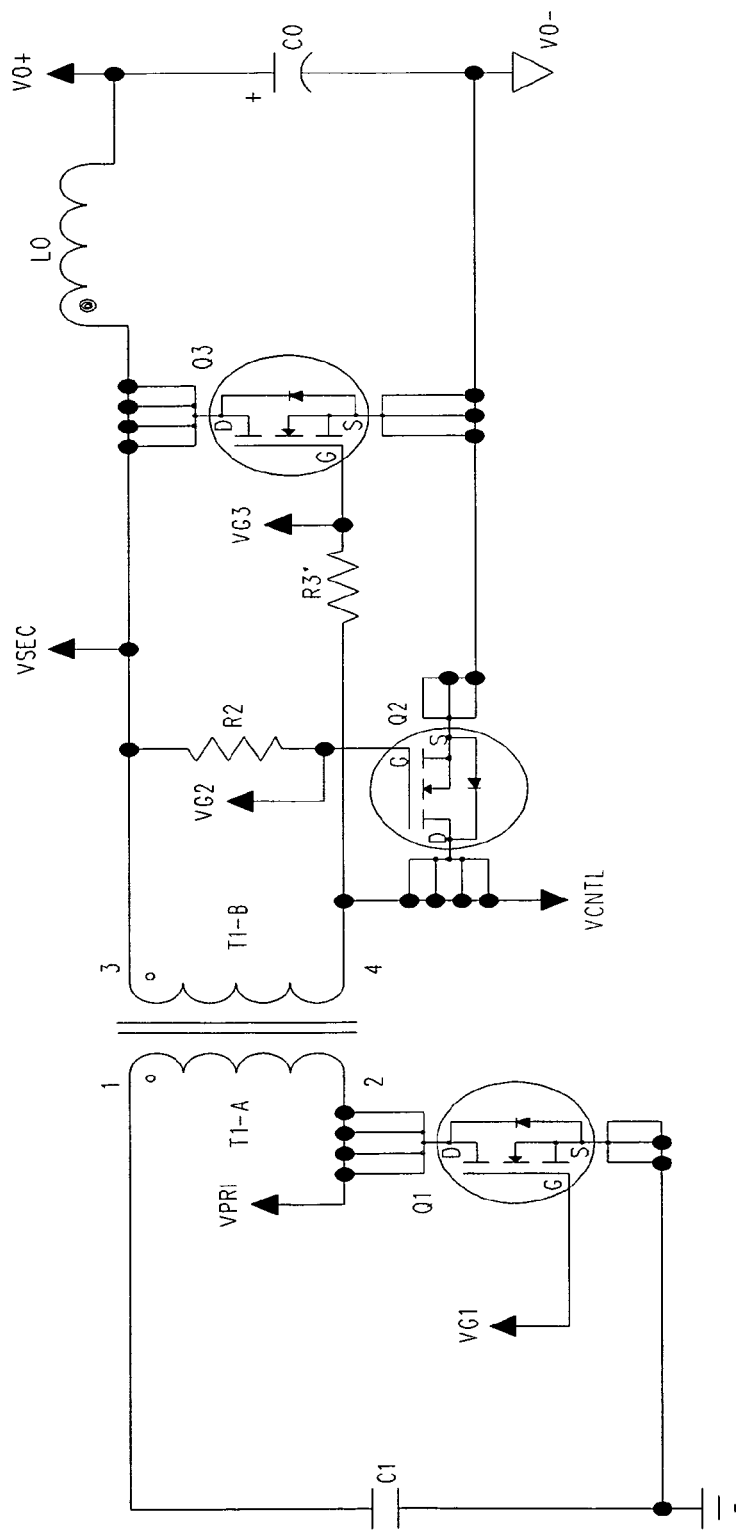
FIG. 1 is a schematic of the prior art implementation of a typical forward converter with a prior art low-voltage, self-synchronized, synchronous rectifier gate drive scheme.
Figure 2:
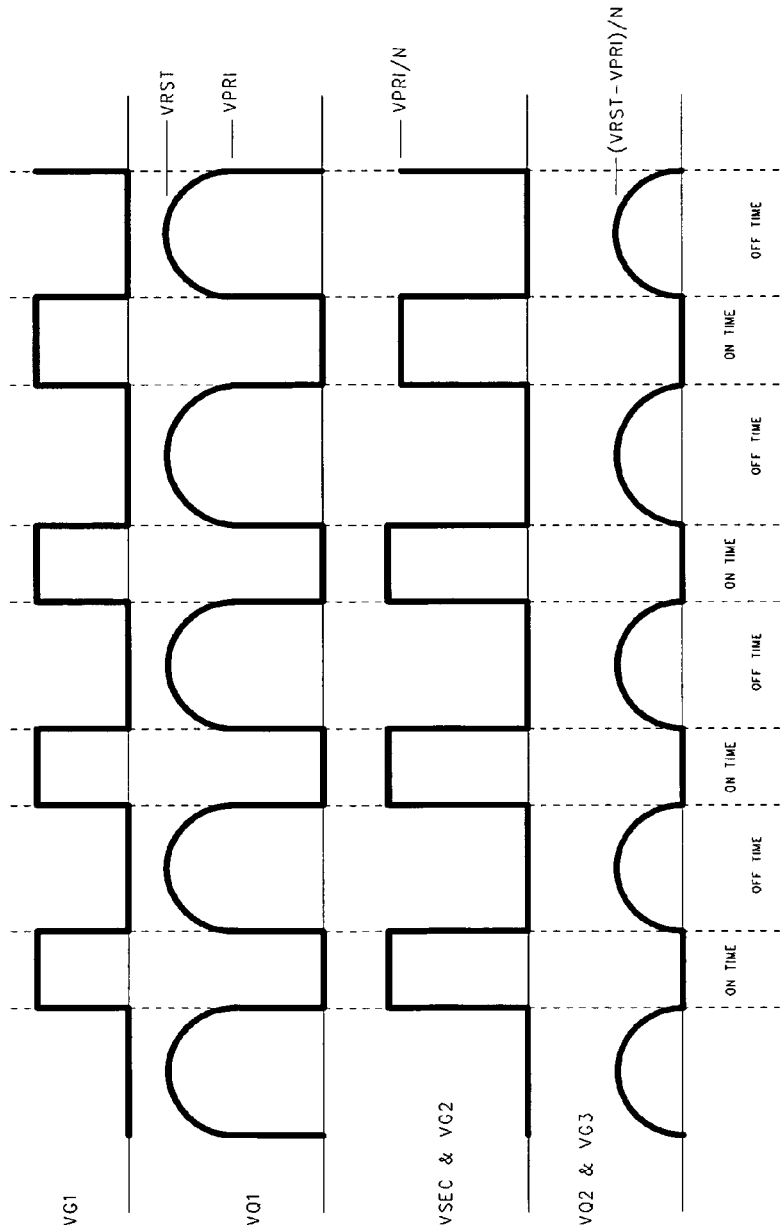
FIG. 2 shows the voltages at various points in the prior art circuit of FIG. 1.

The most typical prior art circuit for this application is a forward converter as shown in FIG. 1. The waveforms associated with the indicated points in the circuit of FIG. 1 are shown in FIG. 2.

Figure 3:
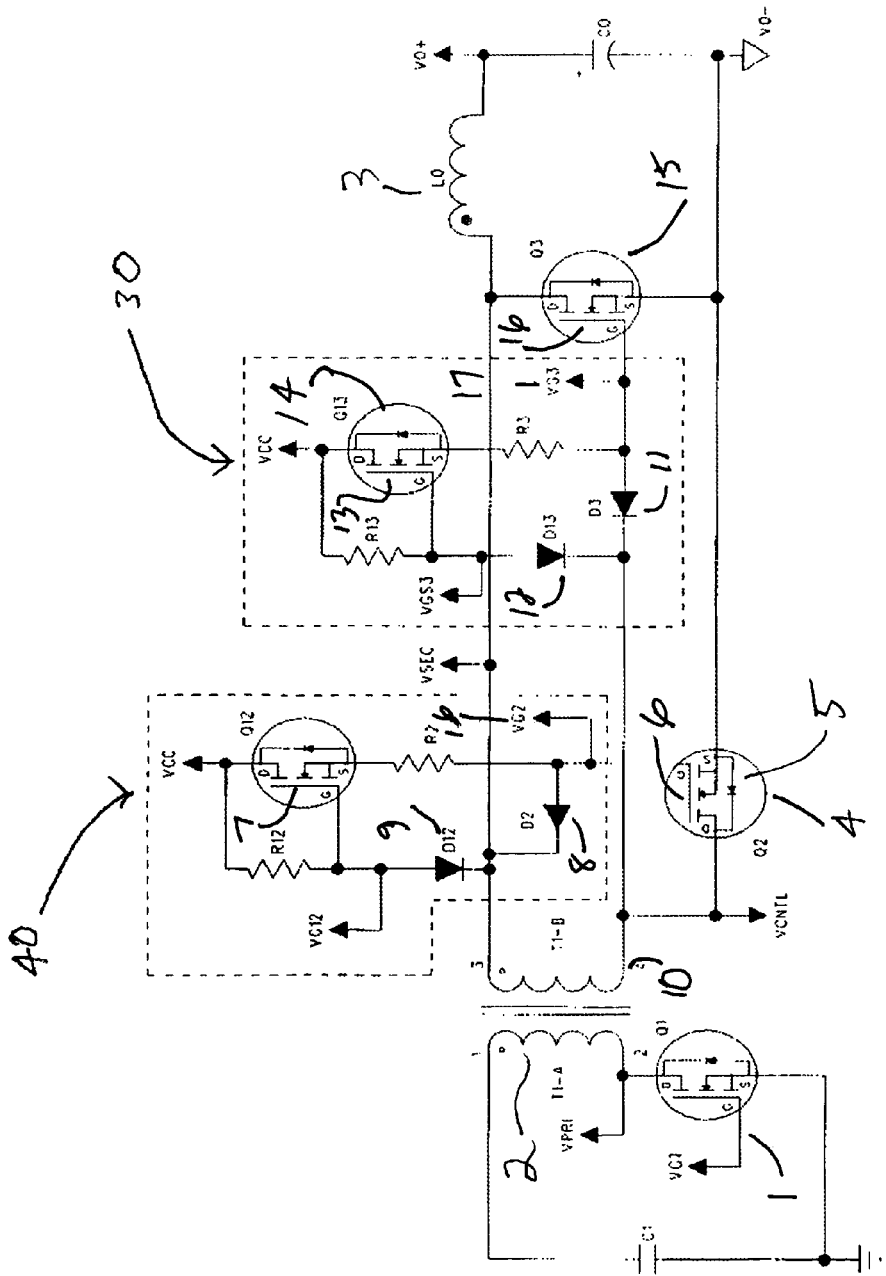
FIG. 3 is a schematic of a forward converter showing a high-voltage, self-synchronized, synchronous rectifier gate drive scheme of the current invention.

FIG. 3 exhibits the invention 30 and 40 (portions enclosed by dotted lines) in a typical application to the forward converter of FIG. 1. However, this application is only one embodiment and should not be considered limiting. The main circuit is fundamentally the same as that of FIG. 1, with the low-voltage gate drive replaced with two driver circuit elements comprising the instant invention. However, the invention may be used with any self-driven synchronous rectifier that may be employed in any of the other various topologies, for example, but not limited to, flyback, push-pull, half-bridge, and others known in the prior art.

Figure 4:
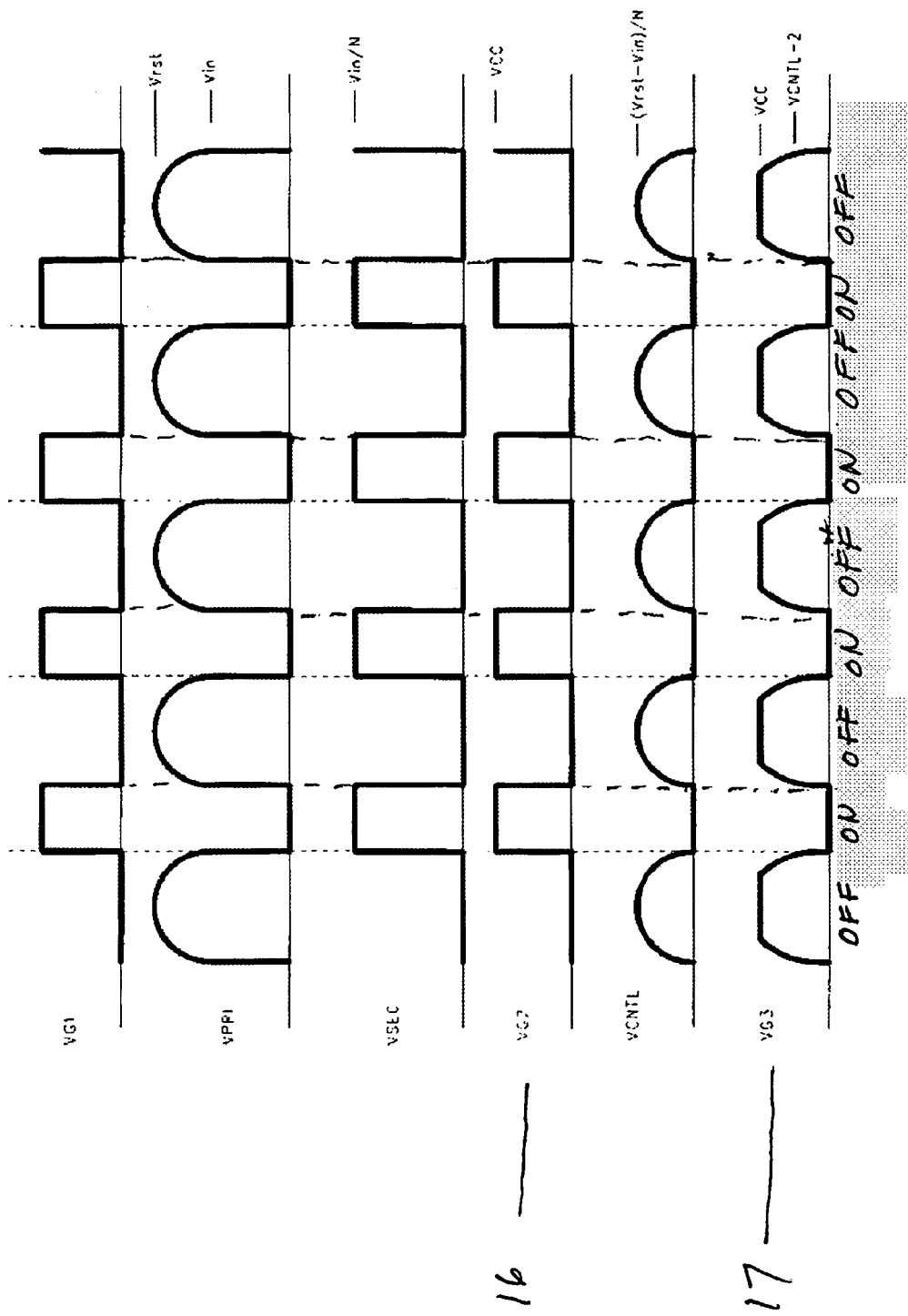
FIG. 4 shows the voltages at various points in the circuit of FIG. 3.

As shown in FIG. 4, during the on-time of the converter, the gate 1 of Q1 is driven high, turning on Q1 and applying a positive voltage across 2 the primary A of transformer T1. An induced positive voltage appears across the secondary B of T1, and is applied to 3 L0 via the conduction of 4 Q2's inherent body diode 5. This positive voltage across the T1 secondary also releases the gates 6 and 7 of synchronous MOSFET Q2 and of driver MOSFET Q12 via the reverse bias found on diodes 8 D2 and 9 D12. Since the gate 7 of Q12 is no longer held low by 9 D12, the gate 7 of Q12 rises to the $V_{cc}$ voltage. This rise turns Q12 on and couples the voltage at $V_{cc}$ to the gate 6 of Q2, turning it on as well.

Also, during this on-time, the voltage at the non-dot end 10 of the T1 secondary is held slightly below ground by 4 Q2. This pulls diodes 11 D3 and 12 D13 to ground. With the gate 13 of 14 Q13 held low by 12 D13, Q13 turns off. This in turn turns off 15 Q3. The turn off of Q3 is additionally aided by the gate 16 of Q3 being held low by 11 D13. With Q2 turned on and Q3 turned off, the inherent body diode 5 of Q2 is shorted by the on-state resistance (rds On) of Q2, thus reducing the power loss in Q2.

When Q1 is turned off, the voltage across the primary of T1 is reversed. This reversed voltage appears across the secondary of T1. The collapsing voltage across the secondary of T1 causes the voltage across L0 to reverse, where it is held a diode drop below ground by the inherent body diode of Q3.

Since the dot end of the T1 secondary is at a diode drop below ground, the no-dot end 10 of the T1 secondary will be positive in relation. This positive voltage will release the gates 16 and 13 of Q3 and Q13 respectively, thereby allowing the gate 13 of Q13 to rise to $V_{cc}$ and turning it on. With Q13 conducting, $V_{cc}$ is coupled to the gate of Q3, turning it on. During this time, the gates 6 of Q2 and 7 Q12 are brought low by the cathodes of diodes 8 D2 and 9 D12. This has the effect of turning off Q2 and Q12 respectively. Now, with Q3 turned on and Q2 turned off, the on-state resistance of Q3 shorts the inherent body diode of Q3, and the power loss in Q3 is reduced.

FIG. 4 illustrates the voltages at other designated points in the circuit of this invention. The most significant difference from the voltages in the prior art circuit shown in FIG. 2 is that 16 VG2 and 17 VG3 have a maximum value of $V_{CC}$.

Figure 5:
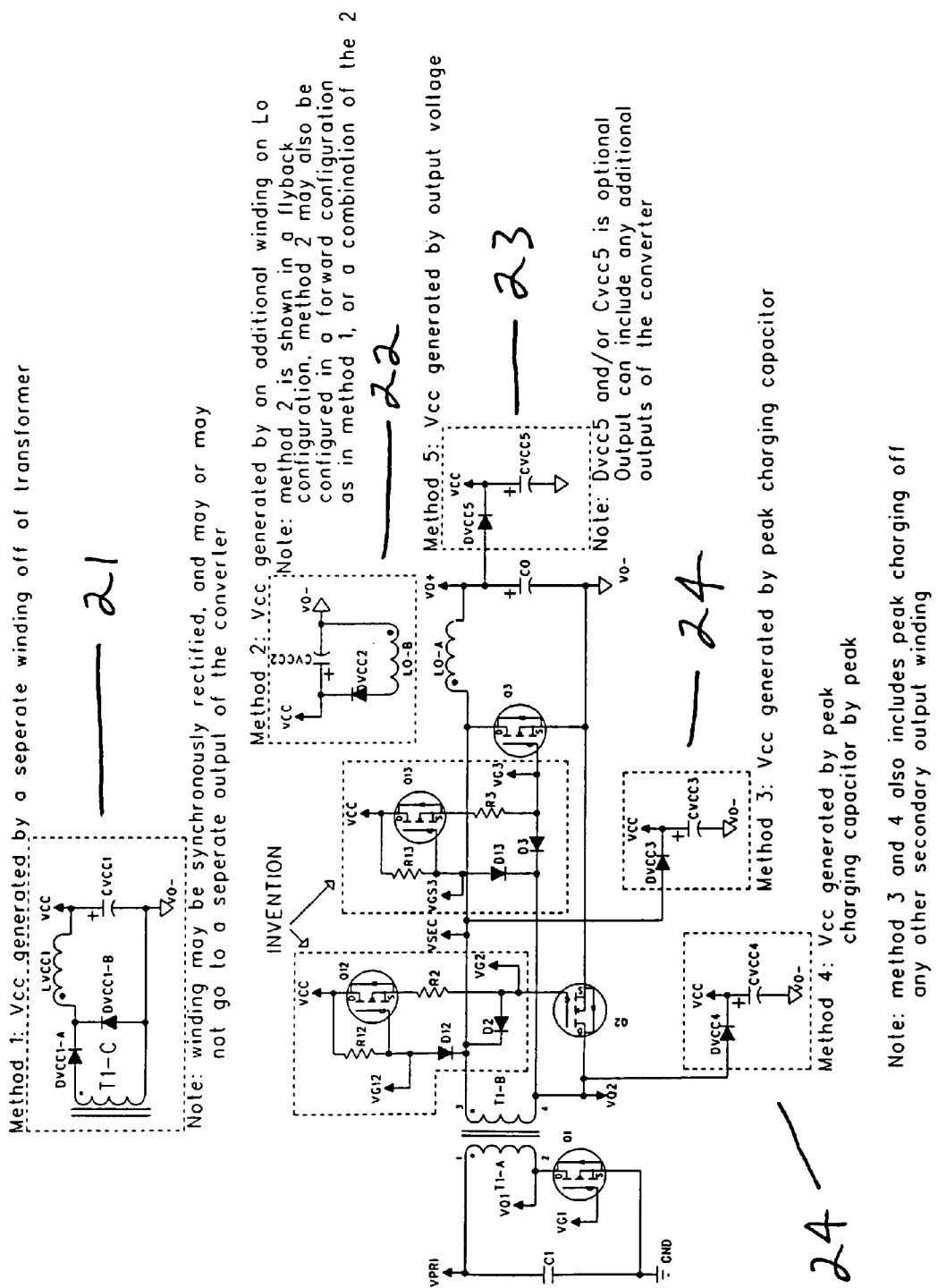
FIG. 5 exhibits non-exclusive examples of methods of producing $V_{cc}$.

The central feature of this invention is use of the fixed voltage source $V_{cc}$. This voltage may be obtained in a number of different ways. (The methods described here are examples and embodiments and do not limit the generality of the invention.) At the most basic level, $V_{cc}$ may be simply be supplied by a battery. This solution would work technically but is impractical. In a real circuit, $V_{cc}$ can be derived from the output (DC) voltage directly or by means of a voltage divider. Alternatively it may be produced by one of the methods shown in FIG. 5. These include obtaining it from 23 another output voltage on a multi-output converter, from 21 the rectified voltage of another winding on the transformer or 22 a winding on the inductor, or 24 from 'peak charging' the output voltage of the current winding or an additional winding. In most applications a voltage like $V_{cc}$ has to be derived to run other circuits anyway, so that no cost is added to the circuit to obtain this voltage.

I claim:

1. A self-synchronized synchronous rectifier power supply circuit comprising:
    a transformer having a primary winding and a secondary winding;
    a primary circuit connecting an input alternating voltage to the primary winding;
    a secondary circuit comprising:
        a low pass output filter and a synchronous rectifier circuit connecting the secondary winding to the low pass output filter;
        wherein the synchronous rectifier circuit comprises:
            first and second synchronous rectifier switches each controlled by a signal applied to an included control electrode of the switch;
            first and second driver switches connected in series with the included control electrodes of the first and second synchronous rectifier switches such that the first and second driver switches control the voltage supplied from an external DC source to the included control electrodes of the first and second synchronous rectifier switches;
            a means for establishing a DC potential on the drain electrodes of the first and second driver switches;
            a driver date resistor connected between the DC potential and the gate electrodes of the first and second driver switches;
            the gate electrode of the first and second driver switch being controlled by a secondary winding such that when a voltage less than the threshold voltage of the MOSFET is presented on the winding, the gate of the driver switch is turned off and
            when a voltage greater than the threshold voltage of the MOSFET is present on the secondary winding, the gate electrode of the driver switch is allowed to float or be pulled to a higher voltage by the driver gate resistor turning the MOSFET on.

2. A self-synchronized synchronous rectifier power supply circuit comprising:
    a transformer having a primary winding and a secondary winding;
    a primary circuit connecting an input DC voltage to the primary winding and comprising a power switch periodically biased conducting;
    a secondary circuit comprising:
        a low pass output filter and a synchronous rectifier circuit connecting the secondary winding to the low pass output filter;
        wherein the synchronous rectifier circuit comprises:
            first and second synchronous rectifier switches each controlled by a signal applied to an included control electrode of the switch;
            first and second driver switches connected in series with the included control electrodes of the first and second synchronous rectifier switches such that the first and second driver switches control the voltage supplied from an external DC source to the included control electrodes of the first and second synchronous rectifier switches;
            means for establishing a DC potential on the drain electrodes of the first and second driver switches;
            a driver date resistor connected between the DC potential and a gate electrodes of each of the first and second driver switches;
            the gate electrode of the first and second driver switch being controlled by a secondary winding such that when a voltage less than the threshold voltage of the MOSFET is presented on the winding, the gate of the driver switch is turned off, and
            when a voltage greater than the threshold voltage of the MOSFET is present on the secondary winding, the gate electrode of the driver switch is allowed to float or be pulled to a higher voltage by the driver gate resistor turning the MOSFET on.

3. The circuit of claim 1 additionally comprising a clamping circuit connected to the primary winding and including energy storage means for sustaining a voltage cross the primary winding during an interval when the power switch is biased non-conducting.

4. The circuit of claim 2 additionally comprising a clamping circuit connected to the primary winding and including energy storage means for sustaining a voltage cross the primary winding during an interval when the power switch is biased non-conducting.

* * * * *